United States Patent
Lee et al.

(10) Patent No.: US 9,971,192 B2
(45) Date of Patent: May 15, 2018

(54) DISPLAY PANEL AND DISPLAY DEVICE HAVING THE SAME

(71) Applicant: Samsung Display Co., Ltd., Yongin, Gyeonggi-Do (KR)

(72) Inventors: Hyoung-Joo Lee, Seoul (KR); Kwang-Hyun Kim, Gunpo-si (KR); Sang-Jae Kim, Seongnam-si (KR); Gwan-Young Na, Yongin-si (KR); Seon-Ah Cho, Busan (KR)

(73) Assignee: Samsung Display Co., Ltd. (KR)

( * ) Notice: Subject to any disclaimer, the term of this patent is extended or adjusted under 35 U.S.C. 154(b) by 687 days.

(21) Appl. No.: 14/523,659

(22) Filed: Oct. 24, 2014

(65) Prior Publication Data

US 2015/0293403 A1    Oct. 15, 2015

(30) Foreign Application Priority Data

Apr. 11, 2014 (KR) .................. 10-2014-0043560

(51) Int. Cl.
*G02F 1/1335* (2006.01)
*G02F 1/1343* (2006.01)
*G02F 1/1333* (2006.01)

(52) U.S. Cl.
CPC .... *G02F 1/133528* (2013.01); *G02F 1/13439* (2013.01); *G02F 1/133308* (2013.01); *G02F 2202/22* (2013.01)

(58) Field of Classification Search
CPC ......... G02F 1/133528; G02F 1/133536; G02F 1/13439; G02F 1/133308; G02F 2202/22

USPC ........................................................ 349/96
See application file for complete search history.

(56) References Cited

U.S. PATENT DOCUMENTS

| 6,288,824 | B1 | 9/2001 | Kastalsky |
| 2006/0274248 | A1* | 12/2006 | Kim ................. G02F 1/133528 349/141 |
| 2011/0285941 | A1* | 11/2011 | Liu .......................... G06F 3/044 349/96 |
| 2012/0327020 | A1* | 12/2012 | Kohara ............... G02F 1/13338 345/174 |
| 2013/0038808 | A1* | 2/2013 | Song ................. G02F 1/133707 349/43 |
| 2013/0135723 | A1 | 5/2013 | Kwon et al. |

(Continued)

FOREIGN PATENT DOCUMENTS

| JP | 08-160408 | 6/1996 |
| JP | 09-021997 | 1/1997 |

(Continued)

*Primary Examiner* — Nathanael R Briggs
*Assistant Examiner* — William Peterson
(74) *Attorney, Agent, or Firm* — Innovation Counsel LLP

(57) ABSTRACT

A display panel includes a first substrate, a second substrate facing the first substrate, a liquid crystal layer interposed between the first substrate and the second substrate, a first transparent conductive pattern disposed on a surface of the first substrate and including a plurality of openings, and a first polarizing member combined with the first transparent conductive pattern. The display panel may reduce bending due to contraction of the first polarizing member including a drawn polarizing layer. Furthermore, static electricity generated in the second substrate may be discharged thereby improving reliability of a display device including the display panel.

19 Claims, 6 Drawing Sheets

(56) References Cited

U.S. PATENT DOCUMENTS

2013/0321732 A1* 12/2013 Tang ................. G02F 1/1333
   349/42
2014/0092325 A1* 4/2014 Chen ................. G06F 1/1692
   349/12

FOREIGN PATENT DOCUMENTS

| JP | 10-161553 | 6/1998 |
| KR | 1020060000173 A | 1/2006 |
| KR | 1020090018805 A | 2/2009 |

* cited by examiner

DISPLAY PANEL AND DISPLAY DEVICE HAVING THE SAME

PRIORITY STATEMENT

This application claims priority under 35 U.S.C. § 119 to Korean Patent Application No. 10-2014-0043560, filed on Apr. 11, 2014, and all the benefits accruing therefrom, the content of which is herein incorporated by reference in its entirety.

BACKGROUND

1. Field

Exemplary embodiments relate to a display panel and a display device. More particularly, exemplary embodiments relate to a display panel and a display device that may be used for a liquid crystal display device.

2. Description of the Related Art

Generally, a liquid crystal display device has a small thickness, a light weight and a low power consumption so that the liquid crystal display device is used for a monitor, a notebook computer, a mobile phone or the like. The liquid crystal display device includes a liquid crystal display panel and a backlight assembly. The liquid crystal display panel controls a light transmittance of a liquid crystal layer to display an image. The backlight assembly is disposed under the liquid crystal display panel to provide a light to the liquid crystal display panel.

The liquid crystal display panel includes a polarizing plate to polarize a light provided from the backlight assembly and a light exits from the liquid crystal display panel. When the polarizing plate includes a polarizing layer formed through drawing, the liquid crystal display panel may be bent due to contraction of the polarizing layer. Since the liquid crystal display panel is being developed to reduce its thickness, bending of the liquid crystal display panel may be more deteriorated.

SUMMARY

Exemplary embodiments provide a display panel capable of improving bending.

Exemplary embodiments also provide a display device including the above-mentioned display panel.

According to an exemplary embodiment, a display panel includes a first substrate, a second substrate facing the first substrate, a liquid crystal layer interposed between the first substrate and the second substrate, a first transparent conductive pattern disposed on a surface of the first substrate and including a plurality of openings, and a first polarizing member combined with the first transparent conductive pattern.

In an embodiment, the first transparent conductive pattern includes a plurality of extending portions, which extend in a first direction and are spaced apart from each other in a second direction substantially perpendicular to the first direction, and a peripheral portion continuously connected to the extending portions.

In an embodiment, the openings of the first transparent conductive pattern extend in the first direction, and the first polarizing member includes a polarizing layer drawn in the first direction.

In an embodiment, the openings of the first transparent conductive pattern extend in the first direction, and the first polarizing member includes a polarizing layer drawn in the second direction.

In an embodiment, the display panel further includes a second transparent conductive pattern disposed on a surface of the second substrate and including a plurality of openings and a second polarizing member combined with the second transparent conductive pattern.

In an embodiment, the first polarizing member includes a polarizing layer drawn in a first direction, and the second polarizing member includes a polarizing layer drawn in a second direction substantially perpendicular to the first direction.

In an embodiment, the openings of the first transparent conductive pattern extend in the first direction, and the openings of the second transparent conductive pattern extend in the second direction.

In an embodiment, the first polarizing layer includes a polarizing layer and an adhesive layer contacting the first transparent conductive pattern.

In an embodiment, the second substrate includes a thin film transistor, a pixel electrode electrically connected to the thin film transistor; and a common electrode overlapping with the pixel electrode.

According to an exemplary embodiment, a display device includes a display panel, a light source module configured to provide a light to the display panel, and a receiving container receiving the display panel. The display panel includes a thin film transistor substrate including a thin film transistor and a pixel electrode electrically connected to the thin film transistor substrate, an opposing substrate facing the thin film transistor substrate, a liquid crystal layer interposed between the thin film transistor substrate and the opposing substrate, a first transparent conductive pattern disposed on a surface of the opposing substrate and including a plurality of openings and a first polarizing member combined with the first transparent conductive pattern.

In an embodiment, the receiving container includes a conductive material and is electrically connected to the first transparent conductive pattern.

In an embodiment, the receiving container is electrically connected to the first transparent conductive pattern through a conductive film.

In an embodiment, the display device further includes a conductive connection layer disposed on a peripheral area of the thin film transistor substrate, a connection bump electrically connecting the conductive connection layer to the first transparent conductive pattern and a flexible printed circuit board electrically connected to the conductive connection layer and connected for grounding.

According to the exemplary embodiments, bending of a display substrate including a polarizing member including a drawn polarizing layer may be reduced. Furthermore, static electricity generated in an opposing substrate may be discharged thereby improving reliability of a display device.

BRIEF DESCRIPTION OF THE DRAWINGS

The above and other features will become more apparent by describing exemplary embodiments thereof with reference to the accompanying drawings, in which.

DETAILED DESCRIPTION

Exemplary embodiments will be described more fully hereinafter with reference to the accompanying drawings, in which various embodiments are shown.

Figure 1:
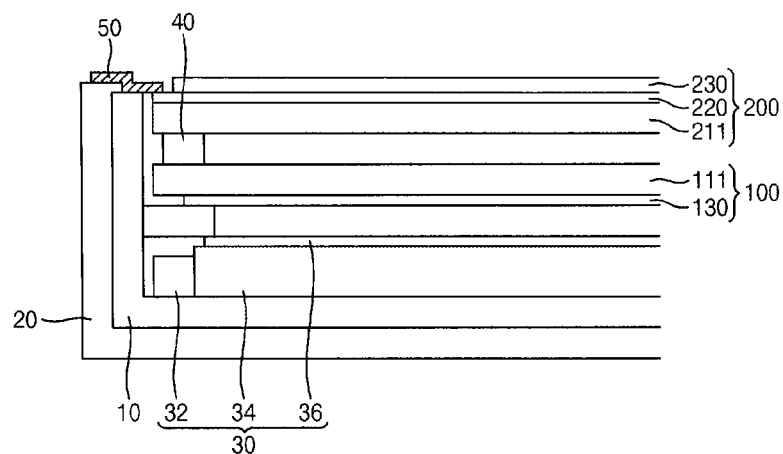
FIG. 1 is a cross-sectional view illustrating a display device according to an exemplary embodiment.

FIG. 1 is a cross-sectional view illustrating a display device according to an exemplary embodiment. Referring to FIG. 1, a display device includes a display panel, a light source module 30 providing a light to the display panel, and a receiving container 20 receiving the display panel and the light source module 30. The display panel includes a first substrate 100, a second substrate 200 facing the first substrate and a sealing member 40 combining the first substrate 100 with the second substrate 200 and surrounding a liquid crystal layer. In one embodiment, the first substrate 100 is a thin film transistor substrate including a thin film transistor array, and the second substrate 200 is an opposing substrate facing the thin film transistor substrate.

The display device further includes a supporting member 10 supporting the display panel. The light source module 30 is disposed under the display panel. The light source module 30 includes a light guide plate 34, a light source 32 disposed to face a side surface of the light guide plate 34 and generating a light, and an optical member 36 changing characteristics of a light exiting from the light guide plate 34.

The supporting member 10 may surround side surfaces of the display panel and the light source module 30. The receiving container 20, sometimes called the receiving member 20, may surround a side surface of the supporting member 10. The supporting member 10 may include a plastic material such as a polymer resin, and the receiving container 20 may include a conductive material such as a metal.

A first transparent conductive pattern 220 is disposed on an upper surface of a base substrate 211 of the opposing substrate 200. The first transparent conductive pattern 220 may discharge static electricity that may be generated in the process of manufacturing the opposing substrate 200 or assembling the display device. For example, the first transparent conductive pattern 220 is electrically connected to the receiving container 20 through a conductive connection member 50. The conductive connection member 50 may be a film including a metal such as copper, aluminum or the like, and may be attached to the receiving container 20 and the first transparent conductive pattern 220 through a conductive adhesive or the like.

The display panel and the first transparent conductive pattern 220 will be described more fully hereinafter.

Figure 2:
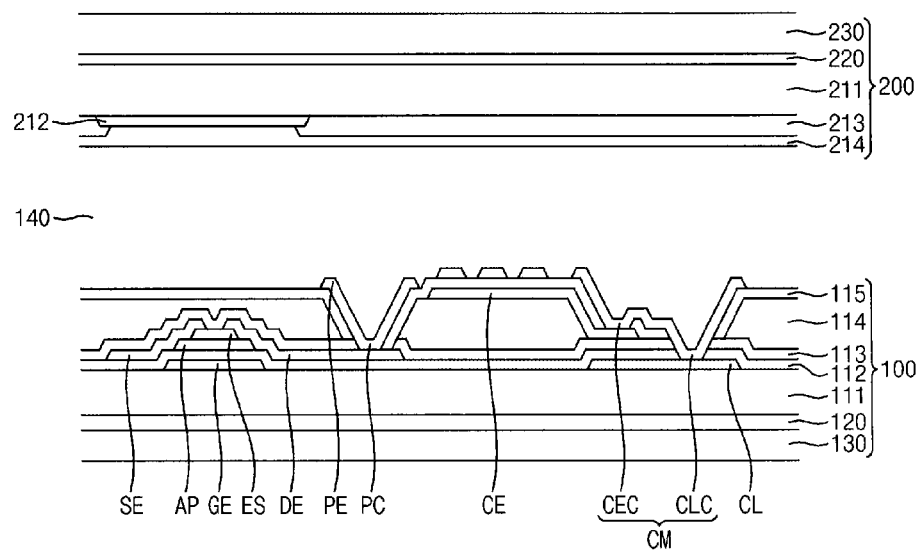
FIG. 2 is a cross-sectional view illustrating a display panel of the display device of FIG. 1.

FIG. 2 is a cross-sectional view illustrating the display panel of the display device of FIG. 1. Referring to FIG. 2, the display panel includes the thin film transistor substrate 100, the opposing substrate 200 facing the thin film transistor substrate 100, and a liquid crystal layer 140 interposed between the thin film transistor substrate 100 and the opposing substrate 200.

The thin film transistor substrate 100 includes a thin film transistor array disposed on a first surface of a base substrate 111. Each thin film transistor of the thin film transistor array includes a gate electrode GE, an active pattern AP, a source electrode SE and a drain electrode DE. The drain electrode DE is electrically connected to a pixel electrode PE. The pixel electrode PE receives a data voltage through the drain electrode DE to form a liquid crystal capacitor with a common electrode CE.

Examples of the base substrate 111 may include a glass substrate, a quartz substrate, a soda lime substrate, a plastic substrate including a polymer resin, or the like.

The gate electrode GE is electrically connected to a gate line. The thin film transistor substrate 100 further includes a common line CL electrically connected to the common electrode CE to provide a common voltage to the common electrode CE. The common line CL may be disposed in a same layer as the gate line.

The thin film transistor substrate 100 further includes a gate insulation layer 112 covering the gate electrode GE and the common line CL.

The active pattern AP overlaps with the gate electrode GE. The active pattern AP may be disposed on the gate insulation layer 112. The active pattern AP may include an oxide semiconductor. When a gate voltage is applied to the gate electrode GE, the active pattern AP is converted into a conductor to function as a channel.

The thin film transistor substrate 100 further includes an etch-stop pattern ES disposed on the active pattern AP. Examples of a material that may be used for the etch-stop pattern ES may include silicon nitride, silicon oxide, aluminum oxide, hafnium oxide, titanium oxide or the like.

The etch-stop pattern ES may have a size smaller than the active pattern AP. For example, the active pattern AP may cover an entire lower surface of the etch-stop pattern ES.

The source electrode SE is spaced apart from the drain electrode DE. The source electrode SE and the drain electrode DE are electrically connected to the active pattern AP. The source electrode SE and the drain electrode DE are formed on the gate insulation layer 112, and contact at least a side surface of the active pattern AP. The source electrode SE and the drain electrode DE may extend to cover a portion of an upper surface of the etch-stop pattern ES.

The thin film transistor substrate 100 further includes a passivation layer 113 covering the thin film transistor, and an organic insulation layer 114 covering the passivation layer 113 and flattening the substrate. The common electrode CE is disposed on the organic insulation layer 114. The thin film transistor substrate 100 further includes a pixel insulation layer 115 covering the common electrode CE. The pixel electrode PE is disposed on the pixel insulation layer 115.

In one embodiment, the pixel electrode PE is disposed on the common electrode CE. In another embodiment, the pixel electrode PE may be disposed under the common electrode CE. In another embodiment, a common electrode may be formed on the opposing substrate 200.

The pixel electrode PE is disposed on the pixel insulation layer 115. The pixel electrode PE includes a slit portion SP. The slit portion SP has a shape extending in a direction. The pixel electrode PE overlaps with the common electrode CE to form an electric field depending on a voltage applied thereto thereby controlling alignment of liquid crystal molecules on the pixel electrode PE. The pixel electrode PE includes a pixel contact PC passing through the pixel insulation layer 115, the organic insulation layer 114 and the passivation layer 113 to contact the drain electrode DE.

The common electrode CE and the pixel electrode PE may include a transparent conductive oxide such as indium zinc oxide, indium tin oxide or the like.

The thin film transistor substrate 100 further includes a connection member CM electrically connecting the common electrode CE to the common line CL. The connection member CM may be formed from a same layer as the pixel electrode PE. The connection member CM includes a common electrode contact CEC and a common line contact CLC. The common electrode contact CEC passes through the pixel insulation layer 115 to contact the common electrode CE, and the common line contact CLC passes through the pixel insulation layer 115, the organic insulation layer 114, the passivation layer 113 and the gate insulation layer 112 to contact the common line CL.

The opposing substrate 200 includes a black matrix 212 and a color filter 213 formed on a first surface of a base substrate 211. The opposing substrate 200 further includes an overcoating layer 214 covering the black matrix 212 and the color filter 213.

The thin film transistor substrate 100 and the opposing substrate 200 may further include an alignment layer, respectively.

In another embodiment, the black matrix 212 and the color filter 213 may be included in the thin film transistor substrate 100.

A first transparent conductive pattern 220 and a first polarizing member 230 are disposed on a second surface opposite to the first surface of the base substrate 211 of the opposing substrate 200. The first transparent conductive pattern 220 is disposed between the first polarizing member 230 and the base substrate 211. A second transparent conductive pattern 120 and a second polarizing member 130 are disposed on a second surface opposite to the first surface of the base substrate 111 of the thin film transistor substrate 100. The second transparent conductive pattern 120 is disposed between the second polarizing member 130 and the base substrate 111. In another embodiment, the second transparent conductive pattern 120 may be omitted.

The first transparent conductive pattern 220 may discharge static electricity that may be generated in the process of manufacturing the opposing substrate 200 or assembling the display device. The first transparent conductive pattern 220 may include a transparent conductive material such as indium tin oxide, indium zinc oxide or the like. For example, a thickness of the first transparent conductive pattern 220 may be about 1,000 Å to about 10,000 Å.

Figure 3:
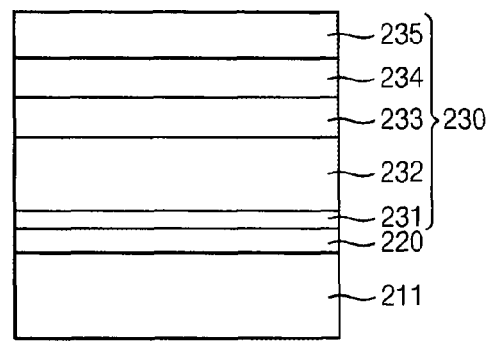
FIG. 3 is an enlarged cross-sectional view illustrating a first polarizing member and a first transparent conductive pattern.

FIG. 3 is an enlarged cross-sectional view illustrating the first polarizing member 230 and the first transparent conductive pattern 220. Referring to FIG. 3, the first polarizing member 230 includes an adhesive layer 231, a base layer 232, a polarizing layer 233, a phase-delay layer 234 and a protective layer 235.

The adhesive layer 231 contacts the first transparent conductive pattern 220 to fix the first polarizing member 230 to the opposing substrate 200.

The polarizing layer 233 includes a polarizing axis along a direction, and an absorption axis substantially perpendicular to the polarizing axis. When a light is incident on the polarizing layer 233, an element of the light, which vibrates in a direction parallel to the polarizing axis, is transmitted, and a rest of the light is absorbed, reflected or diffused. In order to form the polarizing layer 233, a polymer film dyed with a dichroism material such as iodine may be drawn in a direction. The absorption axis of the polarizing layer 233 may be parallel to a drawing direction of the polarizing layer 233. The drawing direction may be defined as the direction, in which the polymer film is drawn to form the polarizing layer 233.

Examples of the polymer film may include a polyvinyl-alcohol film, a polyethylene terephthalate film, an ethylene-acetic acid vinyl copolymer film, ethylene-vinylalcohol copolymer film, a cellulose film or the like. In view of affination of dying with iodine, a polyvinylalcohol film may be suitable.

The base layer 232 supports the first polarizing member 230, and is disposed between the polarizing layer 233 and the adhesive layer 231 to protect the polarizing layer 233. Examples of a material that may be used for the base layer 232 may include a polyester resin, a cellulose resin, a polycarbonate resin, an acryl resin, a styrene resin, a polyamide resin or the like. In an embodiment, a cellulose resin such as triacetyl cellulose may be suitable.

The phase-delay layer 234 delays a phase of a light having passed through the polarizing layer 233. The phase-delay layer 234 may change a viewing angle of a light passing through the first polarizing member 230, or may compensate for color difference to improve an image quality. The phase-delay layer 234 may include a $\lambda/4$ phase-delay layer, a $\lambda/2$ phase-delay layer, or a $3\lambda/4$ phase-delay layer. The phase-delay layer 234 may be prepared by drawing a polymer film or by coating a liquid crystal material on a polymer film. In another embodiment, the phase-delay layer 234 may be disposed between the polarizing layer 233 and the adhesive layer 231, or may be omitted.

The protective layer 235 protects the first polarizing member 230 from an exterior. The protective layer 235 may include a same material as the base layer 232.

In another embodiment, a deposition order of each layers in the first polarizing member 230 may be different. Furthermore, the first polarizing member 230 may further include an anti-reflection layer for preventing reflection of an external light, a hard-coating layer for preventing damage of the polarizing member, an electricity-discharging layer for preventing contamination due to static electricity, or the like.

In one embodiment, the first polarizing member 230 is an absorption polarizer, however, is not limited thereto. In another embodiment, a reflective polarizer may be used for the first polarizing member 230. The reflective polarizer may be prepared by laminating a metal film to a drawn polymer film.

The second polarizing member 130 of the thin film transistor substrate 100 may have a polarizing axis along a same direction as the first polarizing member 230 or along a different direction from the first polarizing member 230. For example, the polarizing axis of the second polarizing member 130 may be substantially perpendicular to the polarizing axis of the first polarizing member 230. The second polarizing member 130 may have a substantially same constitution as the first polarizing member 230. Thus, any duplicated explanation may be omitted.

Figure 4:
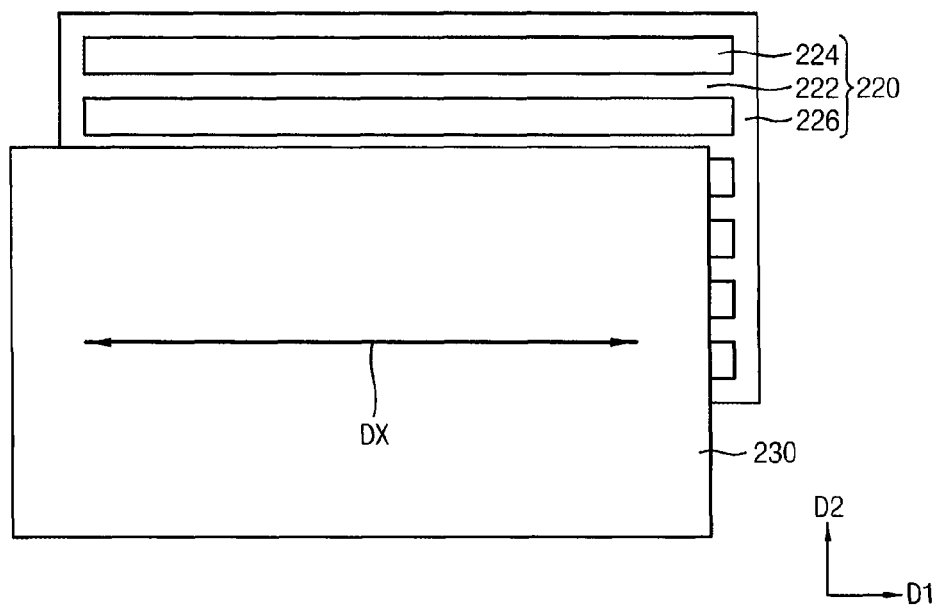
FIG. 4 is a plan view illustrating the first transparent conductive pattern and the first polarizing member of FIGS. 2 and 3.

FIG. 4 is a plan view illustrating the first transparent conductive pattern 220 and the first polarizing member 230 of FIGS. 2 and 3. FIGS. 5 to 9 are plan view illustrating a transparent conductive pattern and a polarizing member of a display device according to exemplary embodiments.

Referring to FIG. 4, the first transparent conductive pattern 220 includes an extending portion 222 extending in a direction and a peripheral portion 226 connected to the extending portion 222. The extending portion 222 extends in a first direction D1. Two adjacent extending portions 222 are spaced apart from each other in a second direction D2 perpendicular to the first direction D1 to define an opening 224. Thus, a plurality of extending portions 222 and a plurality of openings 224 are alternately arranged in the second direction D2. The peripheral portion 226 has a frame shape surrounding the extending portions 222, and is connected to opposing ends of each of the extending portions 222. In an embodiment, the first transparent conductive pattern 220 is suitable to be entirely connected for discharging electricity.

The first polarizing member 230 is combined with the first transparent conductive pattern 220. The first polarizing member 230 includes a polarizing layer drawn in the first direction D1, and an adhesive layer contacting the first transparent conductive pattern 220. The first polarizing member 230 may include an absorption axis parallel to the first direction D1, and a polarizing axis parallel to the second direction D2.

When the first polarizing member 230 includes a polarizing layer formed through drawing, the first polarizing member 230 may contract after the first polarizing member 230 is combined with the opposing substrate 200. Contract of the first polarizing member 230 increases stress of the opposing substrate 200 thereby causing bending of the opposing substrate 200. However, when the first transparent conductive pattern 220 is disposed between the first polarizing member 230 and the opposing substrate 200, slip of the adhesive layer 231 contacting the first transparent conductive pattern 220 increases. Thus, contract force applied to the opposing substrate 200 may be reduced.

Furthermore, in one embodiment, the first transparent conductive pattern 220 is patterned to include the extending portion 222 and the opening 224, which extend in a same direction as a drawing direction DX of the first polarizing member 230. Thus, slip of the adhesive layer 231 may increase more in the drawing direction. Thus, ununiform bending of the opposing substrate 200, which is due to contraction of the first polarizing member 230, may be improved.

Figure 5:
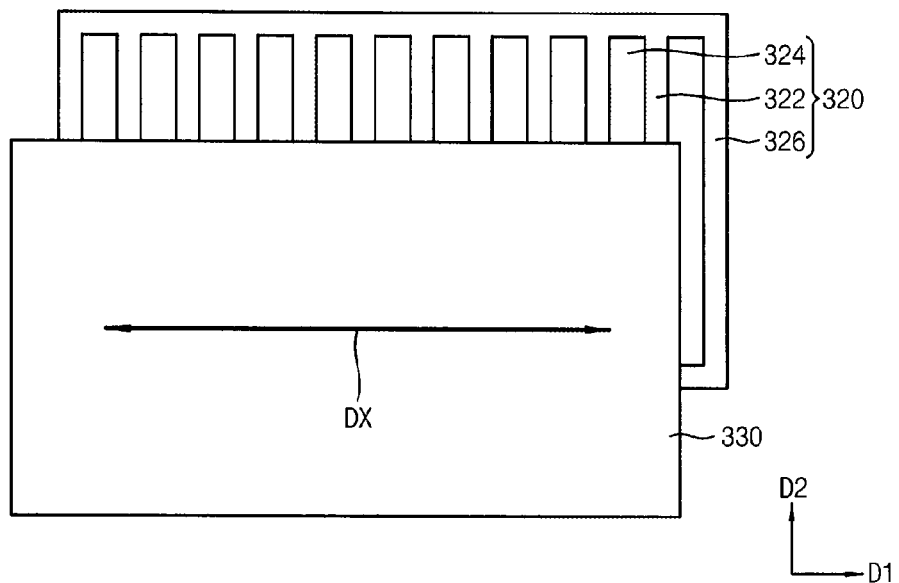
FIGS. 5, 6, 7, 8, 9 are plan view illustrating a transparent conductive pattern and a polarizing member of a display device according to exemplary embodiments.

Referring to FIG. 5, a first transparent conductive pattern 320 includes an extending portion 322 extending in a second direction D2, and a peripheral portion 326 connected to the extending portion 322. Two adjacent extending portions 322 are spaced apart from each other in a first direction D1 perpendicular to the second direction D2 to define an opening 324. Thus, a plurality of extending portions 322 and a plurality of openings 324 are alternately arranged in the first direction D1. The peripheral portion 326 has a frame shape surrounding the extending portions 322, and is connected to opposing ends of each of the extending portions 322.

A first polarizing member 330 is combined with the first transparent conductive pattern 320. The first polarizing member 330 includes a polarizing layer drawn in the first direction D1, and an adhesive layer contacting the first transparent conductive pattern 320.

In one embodiment, the extending direction of the extending portion 322 is perpendicular to the drawing direction DX of the first polarizing member 330. Thus, slip of the adhesive layer may be greater in the drawing direction DX substantially perpendicular to the extending direction of the extending portion 322.

The above combination of the first polarizing member 330 and the first transparent conductive pattern 320 may reduce bending of a display panel depending on a bending direction of a thin film transistor substrate.

Figure 6:
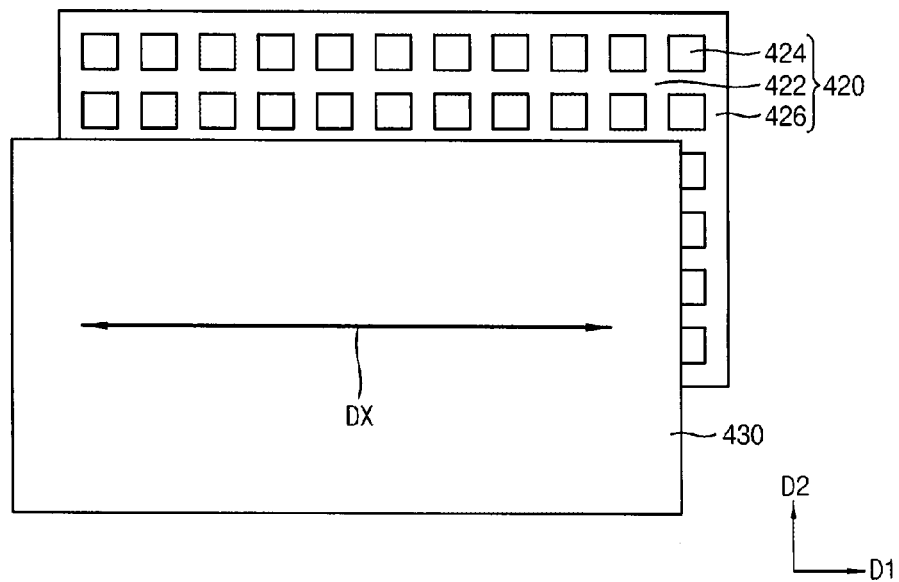

Referring to FIG. 6, a first transparent conductive pattern 420 includes a matrix portion 422 having a net shape or a lattice shape, and a peripheral portion 426 connected to the matrix portion 422. The matrix portion 422 extends in a first direction D1 and in a second direction D2 perpendicular to the first direction D1 to define a plurality of openings 424 spaced apart from each other in the first and second directions D1 and D2. The peripheral portion 426 has a frame shape surrounding the matrix portion 422. The openings 424 may have a square shape, or a bar shape in the first direction D1 or in the second direction D2.

A first polarizing member 430 is combined with the first transparent conductive pattern 420. The first polarizing member 430 includes a polarizing layer drawn in the first direction D1, and an adhesive layer contacting the first transparent conductive pattern 420. Stated another way, the drawing direction DX of the polarizing layer of the first polarizing member 430 is substantially parallel to the first direction D1.

Figure 7:
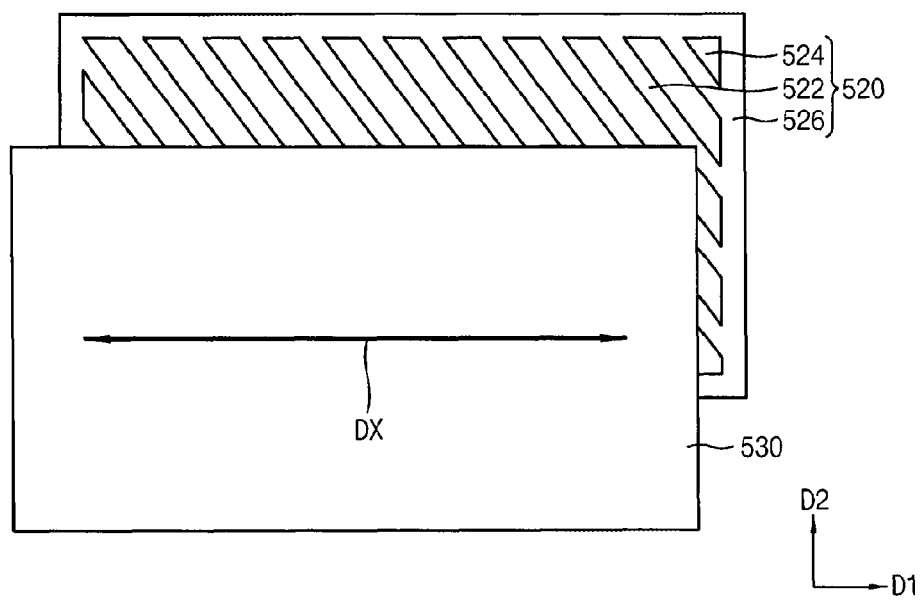

Referring to FIG. 7, a first transparent conductive pattern 520 includes an extending portion 522 extending in a direction, and a peripheral portion 526 connected to the extending portion 522. The peripheral portion 526 has a frame shape surrounding the extending portions 522, and is connected to opposing ends of the extending portion 522. The first transparent conductive pattern 520 has a rectangular shape including a longer side extending in a first direction D1, and a shorter side extending in a second direction D2 perpendicular to the first direction D1, in a plan view. The extending portion 522 may extend in a direction tilted to the first direction D1 and the second direction D2, for example, by about 45 degrees. The extending portions 522 define the openings 524 therebetween.

A first polarizing member 530 is combined with the first transparent conductive pattern 520. The first polarizing member 530 includes a polarizing layer drawn in the first direction D1, and an adhesive layer contacting the first transparent conductive pattern 520. Stated another way, the drawing direction DX of the polarizing layer of the first polarizing member 530 is substantially parallel to the first direction D1.

Figure 8:
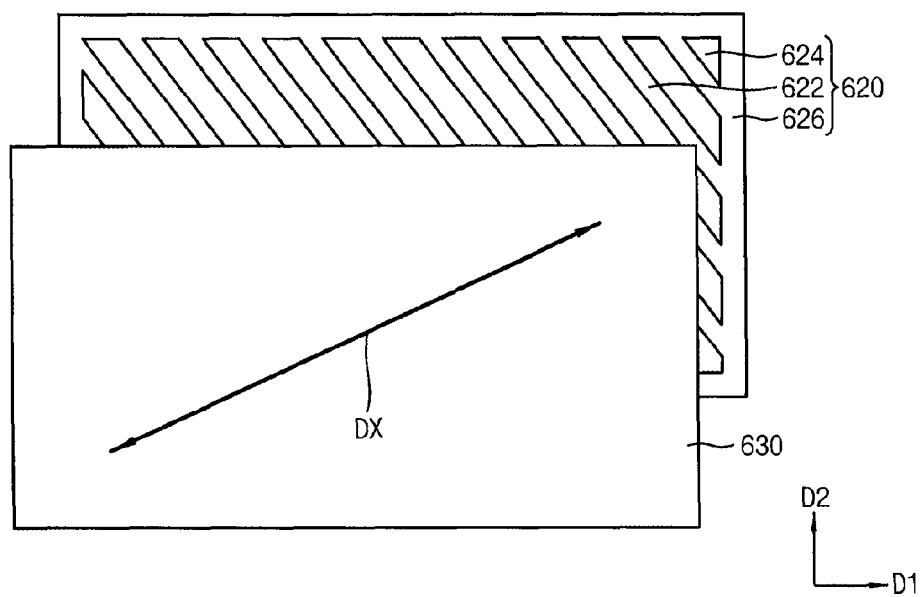

Referring to FIG. 8, a first transparent conductive pattern 620 has a substantially same shape as the first transparent conductive pattern 520 illustrated in FIG. 7. Thus, the first transparent conductive pattern 620 has a rectangular shape including a longer side extending in a first direction D1, and a shorter side extending in a second direction D2 perpendicular to the first direction D1, in a plan view. The extending portion 622 may extend in a direction tilted to the first direction D1 and the second direction D2, for example, by about 45 degrees. The peripheral portion 626 and the openings 624 are substantially the same as the peripheral portion 526 and the openings 524 as illustrated in FIG. 7.

A first polarizing member 630 is combined with the first transparent conductive pattern 620. The first polarizing member 630 includes a polarizing layer drawn in a drawing direction DX substantially perpendicular to the extending direction of the extending portion 622, and an adhesive layer contacting the first transparent conductive pattern 620.

Figure 9:
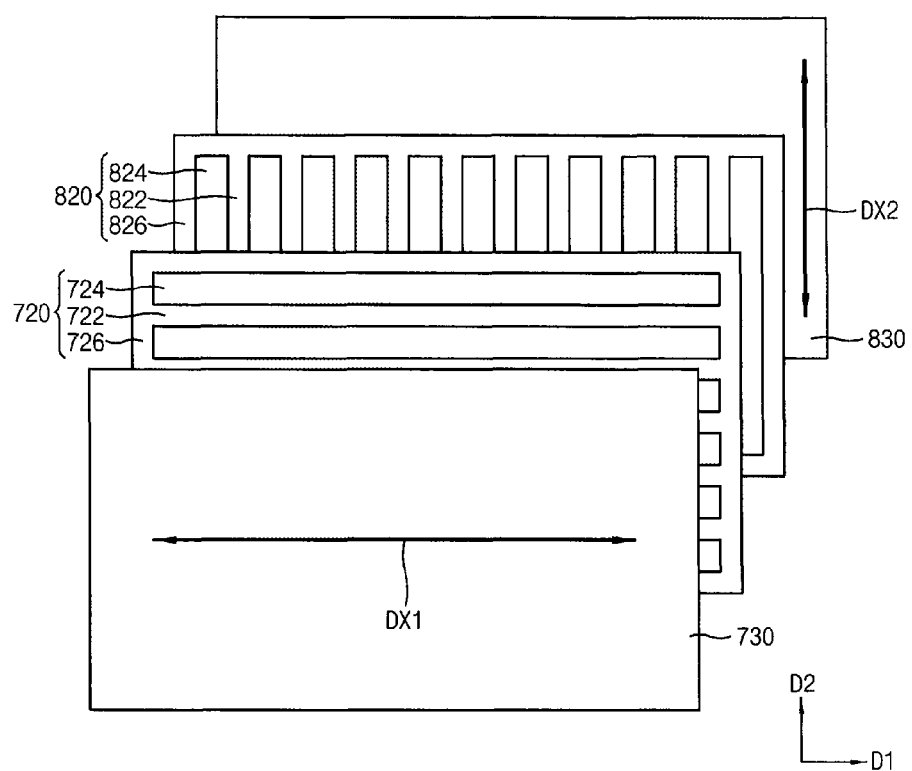

Referring to FIG. 9, a first transparent conductive pattern 720 includes an extending portion 722 extending in a first direction D1 and a peripheral portion 726 connected to the extending portion 722. Two adjacent extending portions 722 are spaced apart from each other in a second direction D2 perpendicular to the first direction D1 to define an opening 724. Thus, a plurality of extending portions 722 and a plurality of openings 724 are alternately arranged in the second direction D2. The peripheral portion 726 has a frame shape surrounding the extending portions 722, and is connected to opposing ends of each of the extending portions 722.

A first polarizing member 730 is combined with the first transparent conductive pattern 720. The first polarizing member 730 includes a polarizing layer drawn in the first direction D1, and an adhesive layer contacting the first transparent conductive pattern 720. Stated another way, the drawing direction DX1 of the polarizing layer of the first polarizing member 730 is substantially parallel to the first direction D1.

A second transparent conductive pattern 820 is disposed between a second polarizing member 830 and a thin film transistor substrate. The second transparent conductive pattern 820 includes an extending portion 822 extending in the second direction D2 and a peripheral portion 826 connected to the extending portion 822. Two adjacent extending portions 822 are spaced apart from each other in the first direction D1 to define an opening 824. Thus, a plurality of extending portions 822 and a plurality of openings 824 are alternately arranged in the first direction D1. The peripheral portion 826 has a frame shape surrounding the extending portions 822, and is connected to opposing ends of each of the extending portions 822.

The second polarizing member 830 includes a polarizing layer drawn in the second direction D2, and an adhesive layer contacting the second transparent conductive pattern 820. Stated another way, the drawing direction DX2 of the polarizing layer of the second polarizing member 830 is substantially parallel to the second direction D2.

Bending of a display panel may variously appear depending on a thickness of a base substrate, a drawing direction of a polarizer, combination of an upper polarizer and a lower polarizer or the like. Besides the embodiments explained with reference to FIGS. 4 to 9, bending of a display panel may be improved by adjusting or changing a shape of a transparent conductive pattern, an extending direction of an extending portion, a ratio of widths of openings and extending portions.

Furthermore, static electricity may be prevented in an opposing substrate of a liquid crystal display panel so that damage or deterioration of the liquid crystal display panel is prevented.

Figure 10:
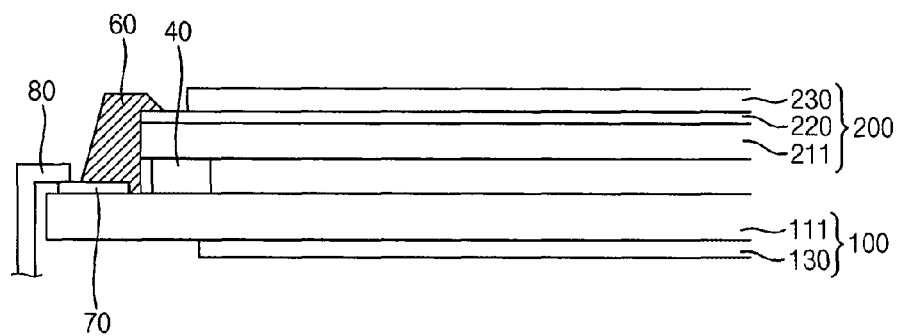
FIG. 10 is a cross-sectional view illustrating a display panel according to another exemplary embodiment.

FIG. 10 is a cross-sectional view illustrating a display panel according to another exemplary embodiment. Referring to FIG. 10, a display panel includes a thin film transistor substrate 100, an opposing substrate 200 facing the thin film transistor substrate 100 and a sealing member 40 combining the thin film transistor substrate 100 with the opposing substrate 200 and surrounding a liquid crystal layer. In one embodiment, a first transparent conductive pattern 220 is disposed on an upper surface of a base substrate 211 of the opposing substrate 200. The display panel is substantially the same as the display panel illustrated in FIGS. 1 and 2 except for ground connection of the first transparent conductive pattern 220.

The first transparent conductive pattern 220 may be electrically connected to a flexible printed circuit board 80 through a conductive connection member. For example, a conductive connection layer 70 is disposed on a peripheral area of an upper surface of the thin film transistor substrate 100, and the display panel further includes a connection bump 60 contacting the first transparent conductive pattern 220 and an end of the conductive connection layer 70. The flexible printed circuit board 80 is connected to an end of the conductive connection layer 70. The flexible printed circuit board 80 is connected to a control board, a receiving container, a bottom chassis or the like for grounding.

The conductive connection layer 70 may be formed from a transparent conductive layer, a gate metal layer, a data metal layer or the like, and may be partially covered by an insulation layer. The connection bump 60 may be formed from a conductive paste including a metal such as silver.

The flexible printed circuit board 80 may also transmit a driving signal to a gate driver or a data driver of the display panel.

According to one embodiment, static electricity may be prevented in an opposing substrate of a liquid crystal display panel so that damage or deterioration of the liquid crystal display panel is prevented.

The embodiments may be used for a display device such as a liquid crystal display device.

The foregoing is illustrative and is not to be construed as limiting thereof. Although a few exemplary embodiments have been described, those skilled in the art will readily appreciate that many modifications are possible in the exemplary embodiments without materially departing from the novel teachings, aspects, and features of the inventive concept. Accordingly, all such modifications are intended to be included within the scope of this disclosure.

What is claimed is:

1. A display panel comprising:
   a first substrate;
   a second substrate facing the first substrate and including a thin film transistor, a pixel electrode electrically connected to the thin film transistor and a common electrode configured to receive a common voltage;
   a liquid crystal layer interposed between the first substrate and the second substrate;
   a first transparent conductive pattern disposed on a surface of the first substrate and including a plurality of openings; and
   a first polarizing member combined with the first transparent conductive pattern,
   wherein the first transparent conductive pattern except for the openings has an entirely continuous shape in the same layer.

2. The display panel of claim 1, wherein the first transparent conductive pattern includes a plurality of extending portions, which extend in a first direction and are spaced apart from each other in a second direction substantially perpendicular to the first direction, and a peripheral portion, which has a continuous frame shape surrounding the extending portions and is continuously connected to the extending portions.

3. The display panel of claim 2, wherein the openings of the first transparent conductive pattern extend in the first direction, and the first polarizing member includes a polarizing layer drawn in the first direction.

4. The display panel of claim 2, wherein the openings of the first transparent conductive pattern extend in the first direction, and the first polarizing member includes a polarizing layer drawn in the second direction.

5. The display panel of claim 1, further comprising:
   a second transparent conductive pattern disposed on a surface of the second substrate and including a plurality of openings; and
   a second polarizing member combined with the second transparent conductive pattern.

6. The display panel of claim 5, wherein the first polarizing member includes a polarizing layer drawn in a first direction, and the second polarizing member includes a polarizing layer drawn in a second direction substantially perpendicular to the first direction.

7. The display panel of claim 6, wherein the openings of the first transparent conductive pattern extend in the first direction, and the openings of the second transparent conductive pattern extend in the second direction.

8. The display panel of claim 1, wherein the first polarizing layer includes a polarizing layer and an adhesive layer contacting the first transparent conductive pattern.

9. A display device comprising:
a display panel including:
a thin film transistor substrate including a thin film transistor, a pixel electrode electrically connected to the thin film transistor substrate and a common electrode configured to receive a common voltage;
an opposing substrate facing the thin film transistor substrate;
a liquid crystal layer interposed between the thin film transistor substrate and the opposing substrate;
a first transparent conductive pattern disposed on a surface of the opposing substrate and including a plurality of openings; and
a first polarizing member combined with the first transparent conductive pattern,
a light source module configured to provide a light to the display panel; and
a receiving container receiving the display panel,
wherein the first transparent conductive pattern except for the openings has an entirely continuous shape in a same layer.

10. The display device of claim 9, wherein the first transparent conductive pattern includes a plurality of extending portions, which extend in a first direction and are spaced apart from each other in a second direction substantially perpendicular to the first direction, and a peripheral portion which has a continuous frame shape surrounding the extending portions and is continuously connected to the extending portions.

11. The display device of claim 10, wherein the openings of the first transparent conductive pattern extend in the first direction, and the first polarizing member includes a polarizing layer drawn in the first direction.

12. The display device of claim 10, wherein the openings of the first transparent conductive pattern extend in the first direction, and the first polarizing member includes a polarizing layer drawn in the second direction.

13. The display device of claim 9, wherein the display panel further includes:
a second transparent conductive pattern disposed on a surface of the thin film transistor substrate and including a plurality of openings; and
a second polarizing member combined with the second transparent conductive pattern.

14. The display device of claim 13, wherein the first polarizing member includes a polarizing layer drawn in a first direction, and the second polarizing member includes a polarizing layer drawn in a second direction substantially perpendicular to the first direction.

15. The display device of claim 14, wherein the openings of the first transparent conductive pattern extend in the first direction, and the openings of the second transparent conductive pattern extend in the second direction.

16. The display device of claim 9, wherein the first polarizing layer includes a polarizing layer and an adhesive layer contacting the first transparent conductive pattern.

17. The display device of claim 9, wherein the receiving container includes a conductive material and is electrically connected to the first transparent conductive pattern.

18. The display device of claim 17, wherein the receiving container is electrically connected to the first transparent conductive pattern through a conductive film.

19. The display device of claim 9, further comprising:
a conductive connection layer disposed on a peripheral area of the thin film transistor substrate;
a connection bump electrically connecting the conductive connection layer to the first transparent conductive pattern; and
a flexible printed circuit board electrically connected to the conductive connection layer and connected for grounding.

* * * * *